3,661,824
ANTIBLOCKING AGENTS FOR ACRYLATE FILM

George P. Patitsas and Richard G. Bauer, Kent, Ohio, assignors to The Goodyear Tire & Rubber Company, Akron, Ohio
No Drawing. Filed Oct. 26, 1970, Ser. No. 84,232
Int. Cl. C08f 29/46
U.S. Cl. 260—23 AR
4 Claims

ABSTRACT OF THE DISCLOSURE

Acrylate film such as the polymers of 2-ethylhexyl acrylate and acrylonitrile are compounded with a combination of ethylene N-bis oleamide and an animal fat glyceride to improve the antiblocking characteristics of the film.

---

This invention relates to improved acrylate film and particularly to a method of improving the antiblocking properties of the film, such as 2-ethylhexyl acrylate/acrylonitrile film. More specifically, the antiblocking material of this invention produces a synergistic antiblocking effect when used with the above film.

Many films and sheets of plastic tend to "block" when stacked or rolled upon themselves. This blocking or sticking of the sheets to themselves can either be a tolerable nuisance or an intolerable problem, and the compounder is continually required to reduce or eliminate blocking tendencies. Waxes, soaps, silicones, powders, vegetable lecithins, and many other ingredients are commonly used as antiblocking agents.

It has been discovered that the combination of an oleamide and a glyceride has a synergistic effect when used as an antiblocking agent and is effective in reducing adhesion between layers of the film. More particularly, it has been found that when used together, less total agent is necessary than is required of either of the separate ingredients used alone to produce the same effect.

Many film formulations were prepared for evaluating the effectiveness of various antiblocking agents on the copolymer of 2-ethylhexyl acrylate and acrylonitrile. Preliminary tests indicated that two of the antiblocking agents tried showed the most promise. Specifically, it was found that ethylene N-bis oleamide having the formula $$C_{17}H_{33}CONHC_2H_4NHCOH_{33}C_{17}$$

hereinafter referred to as oleamide, and the glycerol esters of a mixture of 1% myristic acid, 24% palmitic acid, and 75% stearic acid, hereinafter referred to as glyceride, have the best antiblocking characteristics.

In order to more fully illustrate the present invention, the following data are given.

PREPARATION OF THE FILM POLYMER

A polymer was prepared by an emulsion polymerization technique in which 186 parts by weight of deionized water, 7.4 parts by weight (28% active surfactant) sodium tetradecyl sulfate, and 0.1 part by weight of $K_2S_2O_8$ (potassium persulfate), was charged to an evacuated reactor and then the charged reactor was flushed twice with nitrogen. Forty parts by weight of acrylonitrile, 60 parts by weight of 2-ethylhexyl acrylate, 1.0 part by weight (55% active) of divinyl benzene, and 0.15 part by weight of mixed tertiary mercaptans, was then charged to the reactor and the batch heated to 140° F. (60° C.) and stirred at 250 revolutions per minute using a turbine agitator with baffles. Twenty-five pounds per square inch of nitrogen pressure was maintained in the reactor. The reaction was conducted until 34.5% solids content was obtained. The batch was then cooled to room temperature and the following emulsified dispersions were added: 0.1 part by weight of Wingstay V (sterically hindered phenolic antioxidant), 0.1 part by weight of dilaurylthiodipropionate, 0.5 part of Weston 440 (thermoplastic phosphite copolymer of pentaerythritol and hydrogenated Bisphenol A having M.W. 2000 to 2300, M.P. 50° C. and phosphorous content of 11% to 13%), and 1.0 part by weight of Cyasorb UV–531 (2-hydroxy-4-n-octoxy benzophenone) in water. The latex was coagulated in a hot aqueous 3.0 weight percent magnesium sulfate solution and washed thoroughly with deionized water. The coagulated crumb was dried in an oven at 50° C. (122° F.).

If after the monomers are added to the reactor, and maintained under 25 p.s.i. nitrogen in the reactor, the batch fails to initiate within one hour, the following solution is added: 0.03 part by weight of sodium bisulfite dissolved in 1.0 part by weight of deionized water. If the total run fails to reach 34.5 weight percent solids the following is added: 0.03 part by weight of sodium bisulfite in 1.0 part by weight of deionized water, and 0.03 part by weight of potassium persulfate in 1.0 part by weight of deionized water.

The compounding variable was the amount of antiblocking agent used. The ingredients were mixed by milling on a cold mill and the batch was then transferred to a hot mill (285° F.) for further mixing and prewarming. If there was no sticking on the mill rolls at this temperature, the batches were calendered at 285° F. with precooling of the film to 85° F. before winding on the roll. All films were made to a thickness of 4 mils. It was found that all silicone or syloid type of antiblocking agents cause sticking of the film on the mill or on the calender rolls.

Formulations containing the oleamide or the glyceride were better than the other formulations for antiblocking properties. The oleamide was found to impart good room temperature release properties to the film and fairly good printability characteristics at 2 phr. and 4 phr. level. The glyceride at 4 phr. level showed better release qualities after prolonged oven aging at 120° F. for 72 hours. The oleamide showed better printability characteristics. Next, a combination of the oleamide and glyceride lubricants were tried in various amounts on the base formula. Antiblocking properties and printability were improved but with surprising results.

The combination of these two antiblocking agents produced a synergistic effect as to film releasing qualities. This was at no reduction in printability or other adverse effects.

Each formulation below was mixed for 5 minutes at 300° F. in a Banbury. Each batch weighed 3000 grams. After milling each batch was placed on an open mill at 285° F. and was continually milled by one operator, while two additional operators were calendering the film 10 inches wide and 10 mils thick. The three calender rolls were kept at 285±5° F. and the fourth roll (last roll before windup) was 100° F. The film was wound up on itself.

The four formulations were as follows:

| Formulation | A | B | C [1] | D |
|---|---|---|---|---|
| Film polymer | 100.00 | 100.00 | 100.00 | 100.00 |
| Oleamide | 3.00 | | | 1.50 |
| Glyceride | | 6.00 | | 1.50 |
| Hoechst Wax GL-3 | | | 4.00 | |

[1] Control.

Four film rolls were prepared, one roll from each formulation, according to the aforementioned procedure. Formulation C was used as a control formulation. It was found that the control, Formulation C, left a deposit on the calender rolls and the calendered film stuck to itself after 3 hours in a 120° F. oven, whereas Formulation D was satisfactory on both counts. Comparison of the four above formulations was made according to the antiblocking test run as follows: An 8" x 8" film sample is folded twice, so that a 4" x 4" piece is obtained. This piece is placed between two glass plates and a 4-lb. weight is placed over the top plate. The whole assembly is placed in an oven at 158° F. for 48 hours. At the end of this period, the film is tested for blocking (sticking). This test showed that the film from formulations A, B, and C blocked. Only Formulation D did not block. The same results were obtained when the four rolls of film from the aforementioned formulations were placed in an oven at 158° F. overnight.

Formulation B containing 6 parts of the oleamide is more effective than 3 phr. of the same lubricant for imparting antiblocking characteristics to the 2-ethylhexyl acrylate/acrylonitrile copolymer. The release properties of formulation A containing 3 phr. glyceride are also proportional to the amount of lubricant used in the copolymer film. The film from formulation D, which contains a blend of the oleamide and glyceride (1.5 phr. of each), exhibits better release properties than the film of formulations containing the same total amount of either the oleamide or glyceride. It was discovered that the combination of the oleamide and glyceride exhibits synergistic characteristics when used as an antiblocking agent for 2-ethylhexyl acrylate and acrylonitrile copolymer.

The acrylate films that may be advantageously treated with the antiblocking agent of this invention are those polymers made from mixtures containing one or more monomers from each of the two essential classes disclosed. While the proportions of each of the two essential monomers in the monomeric mixture may vary somewhat, such variation must be within certain definite limits in order to produce clear, rubbery interpolymers having the improved properties which are the objects of this invention, yet retaining the desirable properties possessed by the polymeric alkyl acrylates.

Typical alkyl acrylates and alkyl methacrylates useful for making acrylate polymers are ethyl acrylate, n-propyl acrylate, n-butyl acrylate, isobutyl acrylate, n-octyl acrylate, 2-ethylhexyl acrylate, methyl methacrylate, butyl methacrylate, n-hexyl methacrylate, tetradecyl methacrylate, n-decyl methacrylate, and 2-ethylhexyl methacrylate.

For example, the mixture advantageously contains from 30 to 90% by weight of one or more alkyl acrylates or mixtures of acrylates and methacrylates and from 10 to 70% by weight of one or more of the vinyl nitrile monomers. It is preferred that the mixture contain from 40 to 80% of alkyl acrylate and 20 to 60% of a vinyl nitrile monomer such as acrylonitrile, methacrylonitrile and ethacrylonitrile.

When the acrylate/vinyl nitrile copolymers are crosslinked, it is preferred that about 0.1 to 5.0 weight percent of the crosslinking agent such as divinyl benzene be used.

The polymerization of the above monomer mixtures may be effected by a number of known methods. For example, polymerization of the alkyl acrylate or an admixture thereof with a minor proportion of alkyl methacrylate may be effected in solution or in a homogeneous system by the application of heat or actinic light with or without the presence of peroxygen compounds known to initiate polymerization. It is preferred, however, to carry out polymerization of the monomeric mixture in aqueous emulsion in the presence of a polymerization initiator and, if desired, a polymerization modifier. The ratio of alkyl acrylate to alkyl methacrylate may vary from 95/5 to 40/60, a major proportion of the acrylate being preferred.

Polymerization initiators include benzoyl peroxide, hydrogen peroxide, cumene hydroperoxide, and other peroxygen compounds as well as other types of polymerization initiators such as diazoamino benzene. Those soluble in hydrocarbons are, of course, preferred in the solution or homogeneous methods in accordance with the invention. Other substances which speed up the reaction such as a reducing agent in combination with one of the peroxygen compounds may be utilized. Polymerization modifiers such as the sulfur-containing modifiers including aliphatic mercaptans usually employed in the polymerization of butadiene hydrocarbons to form rubbery polymers, have much the same effect on the polymerization of the alkyl acrylates and may be advantageously employed when a very soft polymer is desired.

If the polymerization is conducted in emulsion, a water soluble catalyst is employed. Such catalysts include potassium persulfate, ammonium persulate and other recognized water soluble catalysts. Also, if emulsion polymerization is used, the amount of the modifier such as an aliphatic mercaptan may be increased to 0.5 to 1.0 part per 100 parts by weight of polymer.

In the polymerization of the monomeric mixtures of this invention, temperature is not critical, permissible reaction temperatures varying from as high as 100° C. or even higher down to 0° C. or even as low as −10° or −20° C. though the temperature preferably used is in the range of 20° to 80° C. In solution polymerization with temperatures of 20° to 80° C., it is possible to obtain quantitative yields of copolymer in from about 1 to about 15 hours.

While certain representative embodiments and details have been shown for the purpose of illustrating the invention, it will be apparent to those skilled in the art that various changes and modifications may be made therein without departing from the spirit or scope of the invention.

What is claimed is:

1. A film made from the polymer resulting from the reaction of from 40 to 80 parts of an acrylate selected from at least one of the group consisting of alkyl acrylates and alkyl methacrylates wherein the alkyl group contains from 2 to 10 carbon atoms, and 20 to 60 parts of a vinyl nitrile wherein the film contains ethylene N-bis-oleamide, and the glycerol esters of a mixture of 1% myristic acid, 24% palmitic acid and 75% stearic acid as antiblocking agents.

2. The film of claim 1 wherein the acrylate is 2-ethylhexyl acrylate and the vinyl nitrile is acrylonitrile.

3. The film of claim 2 wherein the monomers are present in amounts of 60 and 40 parts by weight respectively.

4. The film of claim 2 wherein each antiblocking agent is present in an amount of about 1.5 parts per 100 parts of film.

References Cited
UNITED STATES PATENTS 3,326,840  6/1967  Ross et al. _____ 260—32.6 PO
3,021,296  2/1962  Ammondson ____ 260—32.6 PO

OTHER REFERENCES

Encyclopedia of Polymer Science and Technology, pp. 529–531 (1965).

DONALD E. CZAJA, Primary Examiner

D. J. BARRACK, Assistant Examiner

U.S. Cl. X.R.

260—28.5 R, 32.6 N